United States Patent
Tang et al.

(10) Patent No.: US 10,009,432 B1
(45) Date of Patent: Jun. 26, 2018

(54) INTELLIGENT REAL-TIME LEAD MANAGEMENT SYSTEMS, METHODS AND ARCHITECTURE

(71) Applicant: PyraLeads, LLC, Pennington, NJ (US)

(72) Inventors: Thy Tang, Pennington, NJ (US); Shuchun Zhang, Pennington, NJ (US); Zhuliang Lu, Pennington, NJ (US); Qichao Du, Pennington, NJ (US)

(73) Assignees: Thy Tang, Pennington, NJ (US); Shuchun Zhang, Pennington, NJ (US); Shuliang Lu, Pennington, NJ (US); Qichao Du, Pennington, NJ (US)

( * ) Notice: Subject to any disclaimer, the term of this patent is extended or adjusted under 35 U.S.C. 154(b) by 169 days.

(21) Appl. No.: 14/997,064

(22) Filed: Jan. 15, 2016

Related U.S. Application Data

(60) Provisional application No. 62/104,576, filed on Jan. 16, 2015.

(51) Int. Cl.
  *G06Q 30/02* (2012.01)
  *H04L 29/08* (2006.01)
  *H04L 12/26* (2006.01)
  *G06Q 30/00* (2012.01)

(52) U.S. Cl.
  CPC ............. *H04L 67/22* (2013.01); *G06Q 30/01* (2013.01); *H04L 43/065* (2013.01)

(58) Field of Classification Search
  CPC ......... H04L 67/22; H04L 67/30; H04L 67/02; G06C 30/0214
  USPC .................. 709/204; 705/14.16, 14.41, 14.44
  See application file for complete search history.

(56) References Cited

U.S. PATENT DOCUMENTS

| | | | | |
|---|---|---|---|---|
| 7,043,531 B1* | 5/2006 | Seibel | ................... | G06Q 30/02 705/14.23 |
| 8,533,038 B2* | 9/2013 | Bergh | ................... | G06Q 10/10 705/14.1 |
| 2006/0004731 A1* | 1/2006 | Seibel | ............... | G06F 17/30719 |
| 2007/0033103 A1* | 2/2007 | Collins | ............... | G06F 17/2785 705/14.41 |
| 2008/0300962 A1* | 12/2008 | Cawston | ........... | G06F 17/30557 705/7.13 |
| 2010/0057556 A1* | 3/2010 | Rousso | .................. | G06Q 30/02 705/14.44 |
| 2010/0070382 A1* | 3/2010 | Inghelbrecht | ........ | G06Q 10/067 705/26.1 |

(Continued)

*Primary Examiner* — Ranodhi Serrao
*Assistant Examiner* — James Fiorillo
(74) *Attorney, Agent, or Firm* — Sprinkle IP Law Group

(57) ABSTRACT

An automated lead management solution receives network traffic from a lead provider server over a network. The network traffic is authenticated, validated, and filtered. Specifically, an intelligent filter engine may filter the network traffic at different levels of granularity such as field, campaign, and tier levels and stop the filtering whenever the network traffic fails an authentication, is invalidated or filtered out. When a lead passes through this rigorous filtering process, the filter engine identifies target system(s) that best matched the lead and sends the lead and data identifying the target system(s) to a ping engine. The ping engine pings the target system(s) sequentially or simultaneously. A response from a target system, which may include an instruction and/or a network address to redirect the network traffic, is then communicated to the lead provider server in real time in response to receiving the network traffic from the lead provider server.

11 Claims, 26 Drawing Sheets

(56) References Cited

U.S. PATENT DOCUMENTS

| | | | | |
|---|---|---|---|---|
| 2010/0223106 A1* | 9/2010 | Hallowell | ......... | G06Q 30/0214 705/14.16 |
| 2011/0060642 A1* | 3/2011 | Davis | ..................... | G06Q 30/02 705/14.41 |
| 2011/0258067 A1* | 10/2011 | Rowell | ................. | G06Q 30/06 705/26.2 |
| 2012/0066061 A1* | 3/2012 | Clement | ............... | G06Q 30/02 705/14.49 |
| 2013/0217365 A1* | 8/2013 | Ramnani | .............. | H04L 67/306 455/414.1 |
| 2013/0253981 A1* | 9/2013 | Lipka | ................ | G06Q 30/0201 705/7.29 |
| 2014/0059422 A1* | 2/2014 | Devara | .............. | G06F 17/2247 715/234 |
| 2014/0081740 A1* | 3/2014 | Lipka | .................... | G06Q 30/02 705/14.42 |
| 2014/0278757 A1* | 9/2014 | Steckel | ............. | G06Q 30/0201 705/7.29 |
| 2015/0046283 A1* | 2/2015 | Bargeron | ........... | G06Q 30/0201 705/26.8 |
| 2015/0178779 A1* | 6/2015 | Malone | ............. | G06Q 30/0261 705/14.58 |
| 2015/0228006 A1* | 8/2015 | Malone | ............. | G06Q 30/0635 705/7.39 |
| 2016/0050316 A1* | 2/2016 | Jain | .................... | H04M 3/4365 379/221.14 |
| 2016/0232540 A1* | 8/2016 | Gao | ................ | G06Q 30/0201 |
| 2016/0371724 A1* | 12/2016 | Kulpa | ............... | H04M 3/5158 |
| 2017/0109769 A1* | 4/2017 | Inghelbrecht | ...... | G06Q 30/0206 |
| 2017/0142040 A1* | 5/2017 | Kansky | ................ | H04L 51/046 |

\* cited by examiner

Add Filter

▼ Detail

All form fields are required.

| | |
|---|---|
| Tenant | All |
| Name | Affiliate ID |
| Filter Type | (1)TableList |
| Variable Type | Integer |
| Variable | c.affiliate_id |
| Status | Active |

Message template for filter out by "Filter Out"

Message template for filter out by "Allow Only"

Source Value: select name, value from dict

Save  Cancel

| Tier [1] | ☒ |

▶ Detail

▼ Filter Setting

Choose filter: [Affiliate ID] [Add] ← 813

| Affiliate ID | [▼] | Filter Out |
|---|---|---|
| | ☐ Default Program | |
| Distance Range(mile) | ☐ tang2 | Allow Only |
| | ☐ Gap Associates | |
| | ☐ GenTek Demo | |
| | ☐ Gap Associates - SML | |
| | ☐ Program Email - LP | |
| | ☐ Program Hydra - LP | |
| | ☐ Program Email - DP | |
| | ☐ Program Hydra - DP | |
| | ☐ Program Hydra & Email - LP | |
| | ☐ Program Hydra & Email - DP | |
| ▶ Configuration | ☐ GAP/SLM Date Partner | |
| | ☐ Everything Pension Call | |
| | ☐ Everything Pensions Email | |

[Save] [Cancel]

| Filter [5] | ☒ |
|---|---|

▼ Detail

All form fields are required.

| Tenant | All ▼ |
|---|---|
| Name | Estimated Pension Value |
| Filter Type | (1)Range ▼ |
| Variable Type | Integer ▼ |
| Variable | l.estimated_pension_value |
| Status | Active ▼ |

Message template for filter out by "Filter Out"

[                                    ]

Message template for filter out by "Allow Only"

[                                    ]

Source Value

[                                    ]

[ Save ] [ Cancel ]

| Filter [11] | ☒ |
|---|---|

▼ Detail

All form fields are required.

| | |
|---|---|
| Tenant | All ▼ |
| Name | Monday Service Hours Range |
| Filter Type | (1)Monday Service Hour Range ▼ |
| Variable Type | Time ▼ |
| Variable | c.now_value |
| Status | Active ▼ |

Message template for filter out by "Filter Out"

Message template for filter out by "Allow Only"

Source Value

Save  Cancel

Tier [1]

▶ Detail

▼ Filter Setting

Choose filter: [Monday Service Hours Range] [Add] ←―1013

| Monday Service Hours Range | 08:00:00 | ~ | | Allow Only |
| --- | --- | --- | --- | --- |

Dropdown: 16:00, 17:00, 18:00, 19:00, 20:00, 21:00

| Distance Range(mile) | 0 | ~ | | Allow Only |
| --- | --- | --- | --- | --- |

▶ Configuration

[Save] [Cancel]

Add Filter

▼ Detail

All form fields are required.

Tenant: All

Name:

Filter Type:
- (1)Singleton
- (1)Weekend
- (1)ValidGBGPhone
- (1)Postcode Distance
- (3)Has Accept With Same Field Value
- (1)Monday Service Hour Range
- (1)Tuesday Service Hour Range
- (1)Wednesday Service Hour Range
- (1)Thursday Service Hour Range
- (1)Friday Service Hour Range
- (1)Saturday Service Hour Range
- (1)Contain
- (1)Endwith
- (1)List
- (1)Range
- (1)Regex
- (1)Combination
- (1)TableList
- (1)MinLength
- (1)MaxLength
- (1)BtwLength
- (1)Empty
- (1)Holiday
- (1)Sunday Service Hour Range Variable Type Variable Status Message template Message template Source Value Save   Cancel

Campaign [1]                                                          ⊗

∨ BASE

Publisher          Demo Debt Affiliate      Name              Demo Debt Cam

Data Download      Yes                      Daily Lead Cap    0

Status             Active

∨ INTEGRATION

Domain Url

Integration Method   API

Response Format      Simple Response

Sample Url

∨ FILTER

Choose filter:   -- select --

Is Valid UK Phone           Yes                 Allow Only

Duplicated Lead with        Yes                 Filter Out
      same email

| ID | PUBLISHER | CAMPAIGN | CHANNEL | PROGRAM | EMAIL | TRANSACTION | CREATE DATETIME |
|---|---|---|---|---|---|---|---|
| 59 | Demo Debt Affiliate | Demo Debt Cam(1) | API | Demo Debt Program(1) | demo@pyraleads.com | UNMATCHED CRITERIA(6) | 2015-12-15 08:18:23 |

\> DETAIL

∨ FILTER LOG

| | |
|---|---|
| Filter Id | 3 |
| Filter Name | Is Valid UK Phone |
| Filter Cause | Filtered out for phone_number's value '6094018321' is invalid |
| Filter Message | Value of phone_number does not match the criteria |
| Apply Type | AllowOnly |
| Variable Name | phone_number |
| Variable Value | 6094018321 |
| Filter Value1 | 1 |
| Filter Value2 | |
| Created Datetime | 2015-12-15 08:18:24 |

| 17 | Demo Debt Affiliate | Demo Debt Cam(1) | Demo Pyraleads | 6094018321 | demo@pyraleads.com | 2500 | 350 | 300 | 0 | NOW |
|---|---|---|---|---|---|---|---|---|---|---|

> TRAFFIC

∨ DETAIL

| | |
|---|---|
| Name | Demo Pyraleads |
| Phone Number | 6094018321 |
| Email | demo@pyraleads.com |
| Debt Level | 2500 |
| Monthly Income | 350 |
| Disposable Income | 300 |
| Homeowner | 0 |
| Callback Time | NOW |
| Property Value | 3000 |
| Property Equity | 200 |
| Created Datetime | 2015-12-15 09:15:53 |

Tier 1

| Tier [Tier1] | | | | ☒ |
|---|---|---|---|---|
| ▶ Detail | | | | |
| ▼ Filter Setting | | | | |
| Choose filter: | -- select -- | | | |
| Debt Level Range | 0 | ~ | 2000 | Filter Out |
| Monday Service Hour | 09:00:00 | ~ | 15:00:00 | Allow Only |
| Tuesday Service Hour | 09:00:00 | ~ | 15:00:00 | Allow Only |
| Wednesday Service Hour | 09:00:00 | ~ | 15:00:00 | Allow Only |
| Thursday Service Hour | 00:00:00 | ~ | 00:00:00 | Allow Only |
| Friday Service Hour | 00:00:00 | ~ | 00:00:00 | Allow Only |
| Weekend | Yes | | | Filter Out |
| ▶ Configuration | | | | |
| | | | Save | Cancel |

Tier 2

| Tier [Tier2] | | | | ☒ |
|---|---|---|---|---|
| ▶ Detail | | | | |
| ▼ Filter Setting | | | | |
| Choose filter: | -- select -- | | | |
| Debt Level Range | 0 | ~ | 2500 | Filter Out |
| Weekend | Yes | | | Filter Out |
| Tuesday Service Hour | 00:00:00 | ~ | 00:00:00 | Allow Only |
| Monday Service Hour | 00:00:00 | ~ | 00:00:00 | Allow Only |
| Friday Service Hour | 09:00:00 | ~ | 15:00:00 | Allow Only |
| Thursday Service Hour | 09:00:00 | ~ | 15:00:00 | Allow Only |
| Wednesday Service Hour | 09:00:00 | ~ | 15:00:00 | Allow Only |
| ▶ Configuration | | | | |
| | | | Save | Cancel |

Tier 3

| Tier [Tier3] | | | | ☒ |
|---|---|---|---|---|
| ▶ Detail | | | | |
| ▼ Filter Setting | | | | |
| Choose filter: | --select-- | | | |
| Debt Level Range | 0 | ~ | {l.monthly_payment} | Filter Out |
| Friday Service Hour | 09:00:00 | ~ | 17:00:00 | Allow Only |
| Thursday Service Hour | 09:00:00 | ~ | 17:00:00 | Allow Only |
| Wednesday Service Hour | 09:00:00 | ~ | 17:00:00 | Allow Only |
| Tuesday Service Hour | 09:00:00 | ~ | 17:00:00 | Allow Only |
| Monday Service Hour | 09:00:00 | ~ | 17:00:00 | Allow Only |
| Weekend | Yes | | | Filter Out |
| ▶ Configuration | | | | |
| | | | Save | Cancel |

Campaign [1] ← 1810

> BASE

∨ PROGRAM

| REALTIME TIERS | DATAPARTNER TIERS |

Program: Demo Debt Program ← 1710

Commission Type: Fixed Fee          Fixed Fee: £1.00

Ping Method: Concurrent Ping        Return Point: On First Accept

| ID | NAME | TYPE | PPL | DEFAULT RATE | CUST. FIXED FEE | CUST. PERCENTAGE | SEQUENCE | WEIGHT | STATUS |
|---|---|---|---|---|---|---|---|---|---|
| 1 | Tier 1 | CPF | £1.00 | 50% | | | 0 | 0 | Active |
| 5 | Tier 2 | CPF | £1.00 | 50% | | | 0 | 0 | Active |
| 7 | Tier 3 | CPF | £1.00 | 50% | | | 0 | 0 | Active |

1720

SAVE    CANCEL

| 27 | Demo Debt Affiliate | Demo Debt Cam | Demo Pyraleads | demo@pyraleads.com | 18666926655 | 2500 | 350 | 300 | 0 | NOW | ACCEPTED |

▲ Traffic

▲ Detail

▲ Extra

▼ Tier Filter Log

| Tier | Filter | Variable Name | Variable Value | Cause | Created Datetime |
|---|---|---|---|---|---|
| Tier2 | Debt Level Range | debt_level | 2500 | Filtered out for debt_level's value 2500 in range '0' ~ '2500' | 2015-12-15 12:28:00 |
| Tier3 | Debt Level Range | debt_level | 2500 | Filtered out for debt_level's value 2500 NOT in range '0' ~ '350+2000' | 2015-12-15 12:28:00 |

FIG. 19

| 27 | Demo Debt Affiliate | Demo Debt Cam | Demo Pyraleads | 18666926655 | demo@pyraleads.com | 2500 | 350 | 300 | 0 | NOW | ACCEPTED |

▶ Traffic

▶ Detail

▶ Extra

▶ Tier Filter Log

▼ Ping Log

| Id | Poster | Tier | Acceptance Type | Post Type | Result Type | PPL | commission | Created Datetime | Finished Datetime |
|---|---|---|---|---|---|---|---|---|---|
| 25 | Hydra | Tier 1 | CPF | Realtime | Accepted | 1.00 | 0.00 | 2015-12-15 12:28:00 | 2015-12-15 12:28:01 |

| ID | PUBLISHER | CAM | NAME | PHONE | EMAIL | DEBT LEVEL | MONTHLY PAYMENT | DISPOSABLE INCOME | HOMEOWNER |
|---|---|---|---|---|---|---|---|---|---|
| 29 | Demo Debt Affiliate | Demo Debt Cam | Demo Pyraleads | 18666926655 | demo@pyraleads.com | 2500 | 550 | 300 | 0 |

▲ Traffic

▲ Detail

▲ Extra

▼ Tier Filter Log

| Tier | Filter | Variable Name | Variable Value | Cause |
|---|---|---|---|---|
| Tier2 | Debt Level Range | debt_level | 2500 | Filtered out for debt_level's value 2500 in range '0' ~ '2500' |

| ID | PUBLISHER | CAM | NAME | PHONE | EMAIL | DEBT LEVEL | MONTHLY PAYMENT | DISPOSABLE INCOME | HOMEOWNER |
|---|---|---|---|---|---|---|---|---|---|
| 29 | Demo Debt Affiliate | Demo Debt Cam | Demo Pyraleads | 18666926655 | demo@pyraleads.com | 2500 | 550 | 300 | 0 |

▲ Traffic

▲ Detail

▲ Extra

▲ Tier Filter Log

▼ Ping Log

| Id | Poster | Tier | Acceptance Type | Post Type | Result Type | PPL | commission | Created Datetime |
|---|---|---|---|---|---|---|---|---|
| 27 | Hydra | Tier 1 | CPF | Realtime | Accepted | 1.00 | 0.00 | 2015-12-15 12:28:16 |
| 29 | Hydra | Tier 3 | CPF | Realtime | Accepted | 1.00 | 0.00 | 2015-12-15 12:28:16 |

INTELLIGENT REAL-TIME LEAD MANAGEMENT SYSTEMS, METHODS AND ARCHITECTURE

CROSS-REFERENCE TO RELATED APPLICATION(S)

This is a conversion of, and claims a benefit of priority from U.S. Provisional Application No. 62/104,576, filed Jan. 16, 2015, entitled "INTELLIGENT REAL-TIME LEAD MANAGEMENT SYSTEM, METHOD AND ARCHITECTURE," the entire disclosure of which is fully incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to intelligent real-time lead management. More particularly, embodiments disclosed herein relate to intelligent real-time lead management systems, methods and architecture for selectively communicating a potential customer's purchase request received over a network to certain physical devices associated with interested parties immediately after the purchase request is made.

BACKGROUND OF THE RELATED ART

New technologies are resulting in new ways of selling products including high value products such as vehicles. Sellers are deploying new tools and methods that leverage new technologies to gain a competitive edge.

In a conventional vehicle sales scenario, a potential automobile buyer initiates a purchasing process by visiting a dealership or a dealership web site. However, the dealer maintains potentially unnecessary resources to handle the initial visits to the dealership by a potential automobile buyer. Not knowing whether the potential customer intends to make a purchase, a large number of salespersons stand ready to confront all visitors to the dealership. However, many visits are preliminary and do not require the assistance of a salesperson. Accordingly, inefficiency is often experienced in such a conventional vehicle dealership setting.

New vehicle buyers are also researching vehicles on many auto web sites which provide vehicle sale leads to associated dealerships by forwarding the customer contact information and vehicle interest information to these dealerships. For example, a substantial percentage of car buyers begin their car buying process using the Internet and most of the potential car buyers submit lead information prior to physically visiting a dealership. However, without a lead management system, a dealership may be losing valuable leads, prospects, and sales. Moreover, there is a lead time involved by the time the customer is contacted by the sales staff of the dealership. For example, by the time a sales person from the dealership contacts the potential customer, the customer may have moved on to another vehicle or may have been contacted by another dealership. So the vehicle sale lead would be lost. Thus, the inherent delay in the response time introduces potential lost sales in the vehicle sales process based on leads generated for a dealership from auto web sites.

In view of the drawbacks exemplified in these prior approaches, there is room for innovations and improvements.

SUMMARY OF THE DISCLOSURE

Embodiments disclosed herein provide an automated solution for intelligent real-time lead management. In some embodiments, a method for intelligent real-time lead management may include receiving, by a lead management system embodied on non-transitory computer memory, network traffic from a lead provider server communicatively connected to the lead management system over a network. In some embodiments, the network traffic is received by the lead management system from the lead provider server via a communication channel. In some embodiments, suitable communication channels may comprise at least an application programming interface channel, iframe channel, or a combination thereof.

In some embodiments, the network traffic received from the lead provider server may undergo an authentication process. This may entail determining whether the network traffic from the lead provider server contains a client identifier associated with an operator (e.g., a lead provider) of the lead provider server and, when the client identifier is found in the network traffic, determining whether the client identifier matches a key associated with the operator and stored on the lead management system.

In some embodiments, a filter engine of the lead management system may filter the network traffic received from the lead provider server. In some embodiments, the filter engine may process the network traffic through a validation layer and multiple levels of filter layers. The filter engine may stop the filtering when the network traffic fails an evaluation at any point of the validation and/or by any of the filters defined or configured by an associated lead provider.

In some embodiments, processing the network traffic through the validation layer may include parsing the network traffic from the lead provider server; identifying fields and associated field values in the network traffic; and performing at least one evaluation of whether a required field of a campaign is missing from the network traffic, whether a field of the fields in the network traffic is missing an associated field value, whether a field of the fields in the network traffic contains an incorrect associated field value, or whether an associated field value for a field of the fields in the network traffic has an incorrect format.

In some embodiments, the multiple levels of filter layers may include a campaign level filter layer and a tier level filter layer. In some embodiments, processing the network traffic through the campaign level filter layer and the tier level filter layer may include utilizing campaign level filters and tier level filters. The campaign level filters may be defined or configured for a campaign associated with the lead provider. The tier level filters may be defined or configured by the lead provider for different tiers of lead distribution.

In some embodiments, when the network traffic received from the lead provider server passes the filtering, the filter engine may identify one or more target systems that best matched a lead contained in the network traffic and send the lead and data identifying the one or more target systems to a ping engine, for instance, via a servlet. The ping engine may ping the one or more target systems or otherwise communicate with the one or more target systems regarding the lead. This pinging process, which may be performed by the ping engine sequentially or simultaneously, may be stopped when a response from a target system of the one or more target systems is received or when all the pings are finished. The response from the target system, which may include an instruction and/or a network address to redirect the network traffic, is then communicated to the lead provider server in real time in response to receiving the network traffic from the lead provider server.

One embodiment comprises a system comprising at least one processor and a non-transitory computer-readable storage medium that stores computer instructions translatable by the at least one processor to perform a method substantially as described herein. Another embodiment comprises a computer program product having a non-transitory computer-readable storage medium that stores computer instructions translatable by at least one processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIGS. 8A-10C are diagrammatic representations of example user interfaces according to some embodiments; and FIGS. 11-22 are diagrammatic representations of user interfaces illustrating example use cases.

DETAILED DESCRIPTION

Figure 1:
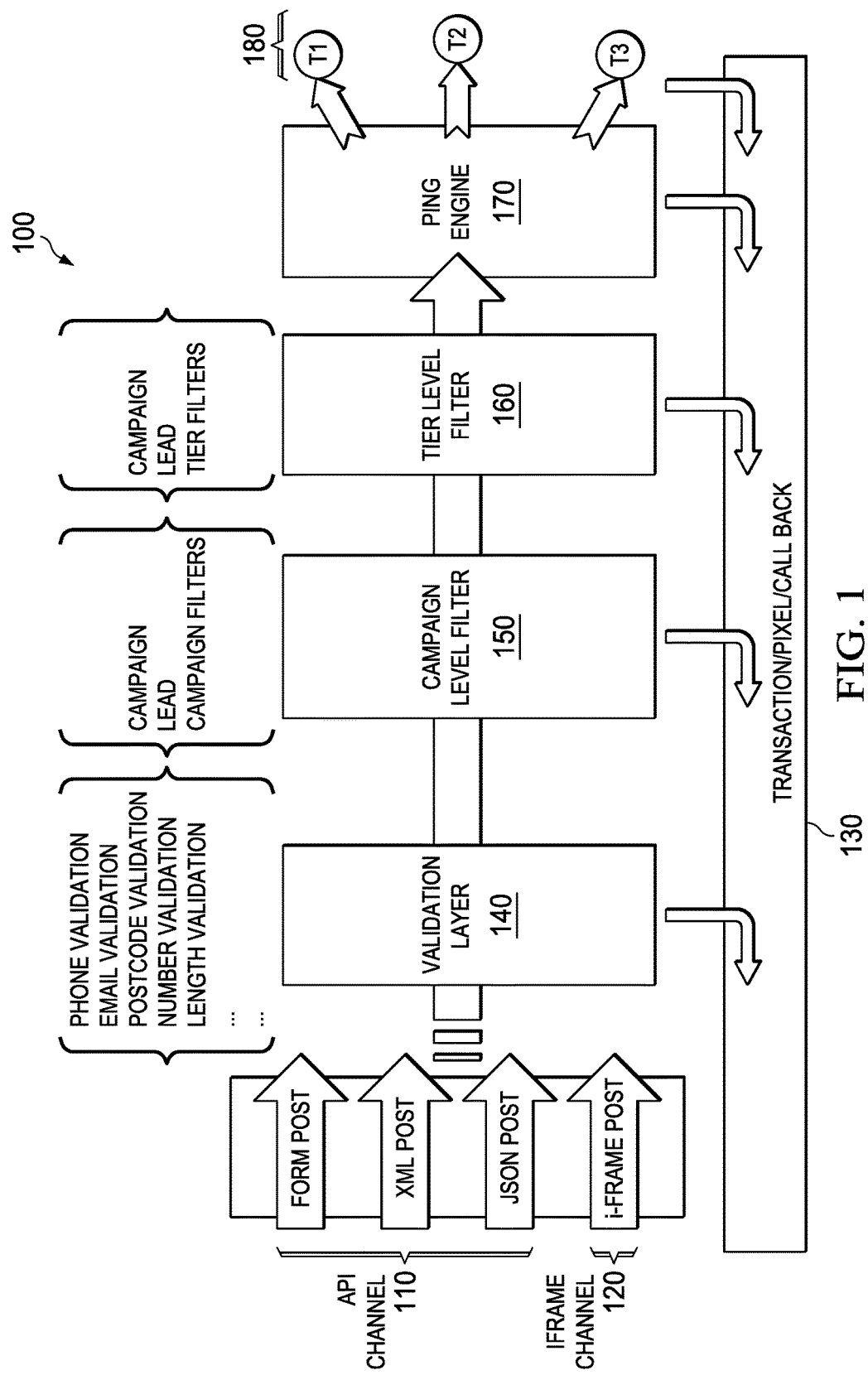
FIG. 1 depicts a diagrammatic representation of an intelligent real-time lead management system according to some embodiments.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments disclosed herein relate to systems, methods, and architecture for cloud-based intelligent real-time lead management. In some embodiments, a system may be embodied on one or more server machines and may include a server communicatively connected to the Internet, a database accessible by the server, a networked user interface configured for user interaction including receiving a potential customer's vehicle purchase request, a filter engine configured for determining that the lead belongs to which one or more specific vehicle dealerships based on a match of the customer's location and vehicle make interest information, a communication module or ping engine associated with the networked user interface to dial phone numbers of the one or more vehicle dealerships immediately after the request is submitted on the networked user interface, and an intelligent lead responder module that allows a lead provider to automate the lead processing by searching inventory of dealers.

In some embodiments, the communication module or ping engine can simultaneously and automatically dial an associated phone number of all the dealerships which match the criteria of a filter built in the networked user interface. For example, a set of vehicle dealerships may be selected for dialing if their location and vehicle manufacturer information matches the customer's location and vehicle make interest information provided by the vehicle buyer. The communication module can connect the vehicle buyer to a single vehicle dealership which answers the phone call first and automatically drops the phone calls to the rest of the vehicle dealerships whose phone numbers were dialed up.

In some embodiments, the system receives Internet or online leads in real time and then immediately calls one or more dealerships so that they can quickly and efficiently respond to and manage these leads. Lead conversion percentage is greatly increased the quicker a sales staff contacts the lead—generally within the first few minutes of receiving the lead. In some embodiments, the intelligent lead responder module can automate the lead processing by searching inventory of dealers before dialing phone numbers of one or more dealerships. This instant contact reduces the response time while still delivering a tailored service that is relevant to the lead and prospect. In some embodiments, the intelligent lead responder module may be customized to query a dealer's current new and pre-owned inventory and then use relevant information specific to the customer's vehicle purchase request. This information can include vehicle make and model information, vehicle availability information, vehicle trim information, vehicle inventory information, etc.

In some embodiments, the system may include a software application running on one or more server computers capable of forwarding or processing requests from a networked user interface. Additionally, the system may leverage any one of a number of well-known server applications, such as the NSCA Web server, the Apache Web server, etc. A server may pass a vehicle purchase request from the networked user interface to a database interface for accessing the database. The database may contain all of the information provided by the seller and/or buyer as described in more detail below. Skilled artisans appreciate that the database can be implemented using various database (DB) management systems such as Oracle DB, Sybase, Microsoft SQL Server, and the like.

In some embodiments, each lead criterion for a filter may be stored in the database in a profile for each participating dealer. Lead criteria may comprise a set of rules selected by the dealer when establishing his/her profile in the database. The dealer profile may be established using an interactive set of webpage forms.

In some embodiments, the system may facilitate the creation and submission of a vehicle purchase request in a form of a lead. The networked user interface may include a web-form on a webpage of a web site accessible by a potential buyer. The potential buyer accesses this webpage and provides the necessary information needed to create a vehicle purchase request.

In some embodiments, the web-form of the networked user interface may include multiple fields. Each field may additionally contain multiple sub-fields. The vehicle buyer provided information may be used to create a vehicle purchase request record. The vehicle purchase request record includes vehicle information such as a make or a model and buyer contact information such as a phone number and an email address.

The vehicle purchase request record may be stored in the database. A vehicle dealership or seller record including information associated with a particular seller such as seller geographic location, available products and pricing etc. may be saved in the database.

A vehicle dealership can provide, for instance, to an administrator of the system, filter rules to set and/or configure a filter or filters for their particular vehicle dealership. Based on filter rules associated with various dealerships, the system can determine how to distribute a lead to particular vehicle dealerships. Alternatively, the system may provide direct access to authorized users associated with vehicle dealerships to set and/or their filter rules dynamically based on their inventory situation and other real-time criteria.

Once a lead is generated by the system, it may then be provided by the system to physical devices associated with select dealer(s) in many ways (for instance, by phone, text, SMS, email, etc.). Optionally, the lead may be stored locally by a dealer in the dealer's own database. The lead can be transferred and stored in a format known and used by the industry and usable by lead management software known to those skilled in the art.

Example embodiments will now be described in detail with reference to FIGS. 1-10C.

FIG. 1 depicts a diagrammatic representation of an intelligent real-time lead management system according to some embodiments. In this example, system 100 is configured for receiving incoming requests via an interface layer comprising at least one of communication channel 110 or communication channel 120. Communication channel 110 may be configured for receiving application interface programming (API) calls and communication channel 120 may be configured for receiving HyperText Markup Language (HTML) elements such as iframe elements. API calls and iframes are known to those skilled in the art and thus are not further described herein.

In some embodiments, communication channel 110 may support various types of APIs, for instance, web APIs that use plain form data, Extensible Markup Language (XML), JavaScript Object Notation (JSON), etc.

In some embodiments, communication channel 120 may support an iframe embedded within a web page of a web site operated by a customer or affiliate of system 100. The iframe page is configured to interact with system 100 and is operable to post data entered by a web site visitor (a potential lead) into the iframe to system 100 when a particular "submit" button on the iframe is selected or otherwise actuated by the web site visitor.

Multiple types of entities may utilize services provided by system 100. For example, an entity such as a dealership may carry or sell a product such as a vehicle inquired by a potential purchaser (a lead) via a web site. The web site may be owned and operated by the dealership or an independent third party. Skilled artisans appreciate that many types of products may be possible and are not limited to vehicles or other types of physical goods. For instance, in the case of a loan product, an entity providing the loan product may be a financial institution or a lender. In the case of a service or a software product, an entity providing the service or the software product may be referred to, from the perspective of a potential purchaser of the service/product, as a service provider, a seller, a retailer, or the like. From the perspective of system 100, such an entity may be interested in purchasing a lead and thus may be referred to as a lead buyer.

As explained below, a lead buyer may have multiple tiers/channels through which system 100 can push leads and/or allow the lead buyer to pull leads (e.g., via target systems 180). To this end, an entity that provides lead information/network traffic on a potential purchaser (e.g., a visitor to their web site, whether the entity sells the product or not) to system 100 (e.g., via channels 110 and 120) may be referred to as a lead publisher or lead provider. System 100 can provide intelligent real-time lead management services to lead providers as well as lead buyers.

In some embodiments, to process network traffic received via channels 110, 120 from lead providers and provide intelligent real-time lead management services/functions, system 100 may employ validation layer 140, campaign level filter 150, tier level filter 160, and ping engine 170. These system components are further described below. In some embodiments, system 100 may further include call back mechanism 130 for providing a feedback mechanism (e.g., to a lead provider) at each stage of processing the incoming traffic, including returning potential response(s) received from target systems 180. Target systems 180 may be computer systems or servers associated with entities interested in purchasing leads (lead buyers).

Those skilled in the art will appreciate that other implementations are also possible. Thus, the example of system 100 shown in FIG. 1 is meant to be illustrative and non-limiting.

Figure 2:
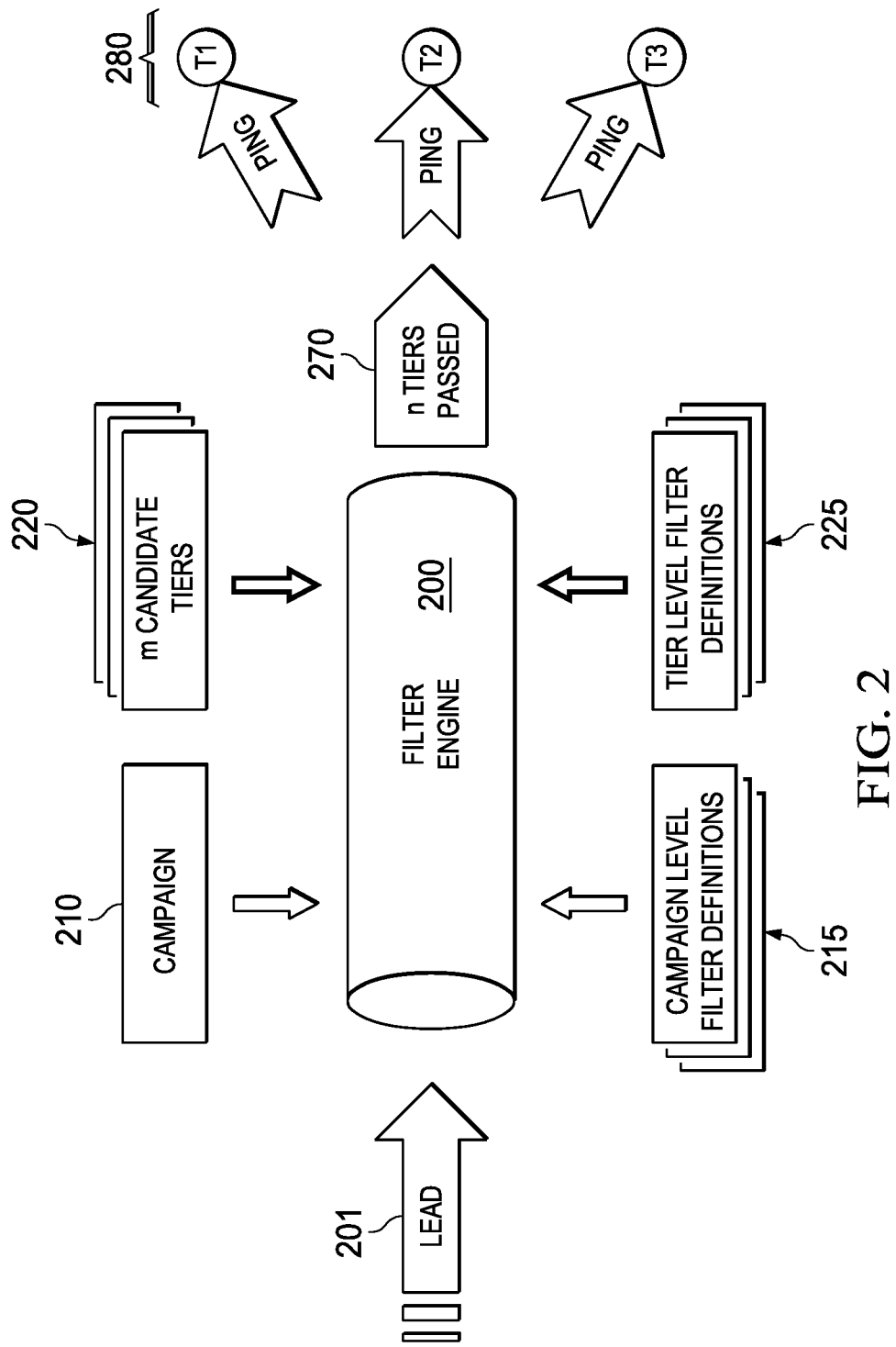
FIG. 2 illustrates an example of a filter engine according to some embodiments.

FIG. 2 illustrates an example of a filter engine according to some embodiments. In this example, filter engine 200 is configured for timely and accurately processing lead 201 to a select set of target systems 280. In the example illustrated, select target systems 280 may include T1, T2, and T3, representing matched sellers of a product that lead 201 is interested in purchasing. In some embodiments, filter engine 200 is configured for processing lead 201 in accordance with filter rules defined at different levels, including campaign level 210 and tier level 220. At campaign level 210, filter rules may be defined in campaign level filter definitions 215 (collectively, campaign level filters). As an example, a campaign level filter definition may be a file stored on a data store accessible by filter engine 200. At campaign level 220, filter rules may be defined in tier level filter definitions 225 (collectively, tier level filters). As an example, a tier level filter definition may be a file stored on the same or different data store accessible by filter engine 200. Filter engine 200 utilizes campaign level filters and tier level filters to filter/select/identify on-the-fly target systems 280 that best or most optimally match lead 201. The resulting set of target systems 280 may be on a single tier or different tiers 270, as illustrated in FIG. 2. A communication module or ping engine may then ping the filtered set of target systems 280 regarding lead 201 to try to get a real time (or substantially real time) response. This is further explained below.

Figure 3:
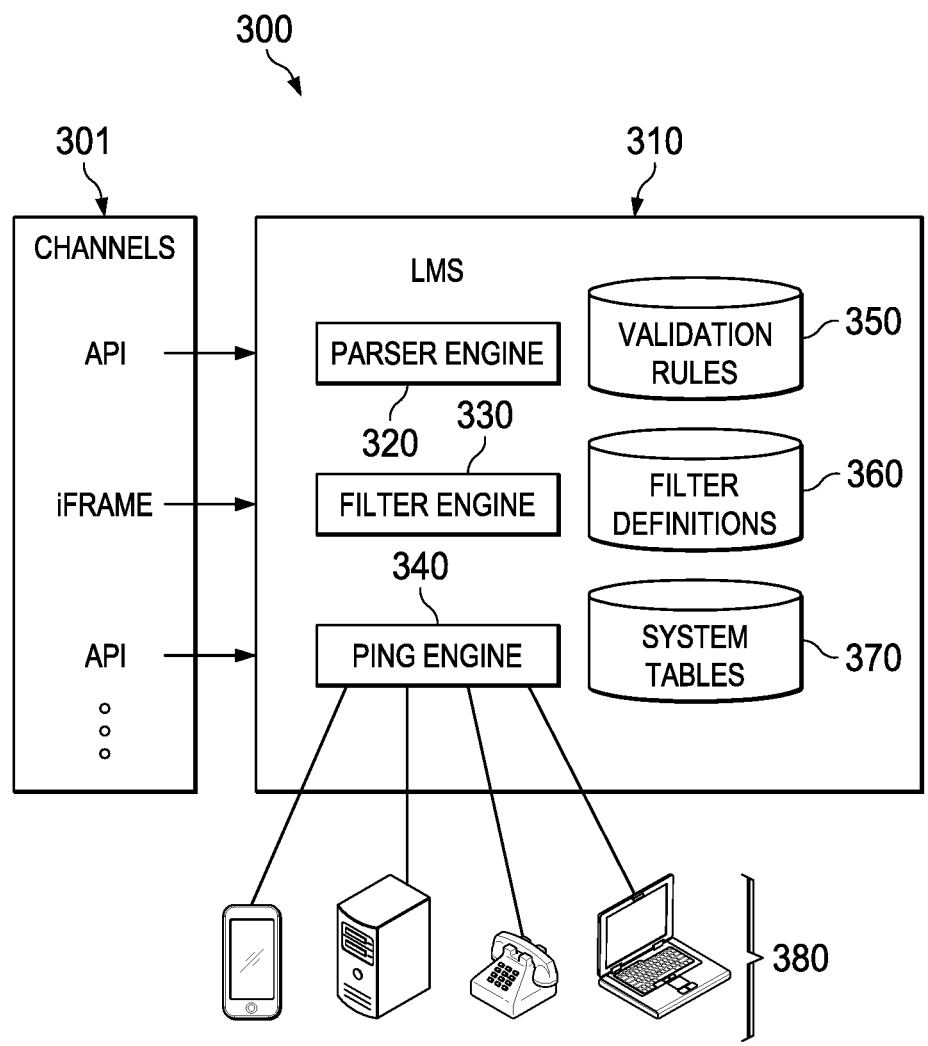
FIG. 3 depicts a diagrammatic representation of an intelligent real-time lead management system (LMS) according to some embodiments.

FIG. 3 depicts a diagrammatic representation of an intelligent real-time lead management system (LMS) according to some embodiments. In this example, LMS 310 may be embodied on one or more server machines operating in network environment 300 and configured for receiving incoming network traffic via channels 301, in a manner similar to system 100 described above with reference to FIG. 1. LMS 310 may include control logic embodied on non-transitory computer memory implementing a plurality of components including parser engine 320, filter engine 330, and ping engine 340, and a plurality of data stores including data store 350 for storing validation rules, data store 360 for storing filter definitions 360, and data store 370 for storing tables 370 used by LMS 310. In some embodiments, network traffic such as a request for purchase or information on a product received via channels 301 may be processed by parser engine 320 based at least in part on some validation rules.

In some embodiments, incoming network traffic may become a lead when validated. The validation layer (see FIG. 1) provides a framework for LMS 310 to insert the fields value format validation feature, for example, different phone number format validation, postcode, email format, length for the fields values. The lead may then be processed by filter engine 330 in accordance with filter definitions that may, for example, include rules defined at different levels, as described above with reference to filter engine 200 shown in FIG. 2. In some embodiments, filter engine 330 may take as input the lead, predefined campaign/tier(s), and filter definitions, and compare values between those in the input lead and in the pre-defined values. In some embodiments, filter engine 330 may stop processing the lead once a comparison returns false. In this example, output from filter engine 330 is either true or false.

Filter engine 330 may implement various comparison methods including based types, special types, and third-part integration types. Non-limiting examples of comparison methods may include:
  Based: equal, contains, between (range), in list, in table, value length, empty, start-with, end-with, regular expression.
  Special: Holiday, Weekend, Weekdays service time, Has Accepted Wth Same Field Value (which, in one embodiment, may be applied only at the campaign level).
  Third-part integration: ValidGBGPhone (e.g., for checking whether a phone number is a validated number), Postcode Distance, and so on.

Non-limiting examples of comparison value formats may include: Int, Float, String, Boolean, Date, Time, Datetime, etc.

The output from filter engine 330 may qualify one or more particular target systems 380 for optimally matching the lead. This information is communicated to ping engine 340. In some embodiments, ping engine 340 may be configured for communicating, sequentially or concurrently, with target systems 380 regarding the lead. This process is referred to herein as pinging. As illustrated in FIG. 3, target systems 380 may be embodied on various types of physical devices that are owned and operated, for instance, by lead buyers.

In some embodiments, ping engine 340 may communicate with qualified target systems 380 (which may be a subset of all target systems 380 communicatively connected to ping engine 340) sequentially or concurrently. In a sequential ping, ping engine 340 may ping qualified target systems 380 sequentially and return a result once a qualified target system accepts the lead. In a concurrent ping, ping engine 340 may ping qualified target systems 380 simultaneously at the same time. In this case, there may be two return trigger points: when the first acceptance is received from a qualified target system or until all pings to qualified target systems 380 are finished. In some embodiments, ping engine 340 may support one or more types of pinging methods, including instance calls, WebPosts (API), emails, etc.

Figure 4:
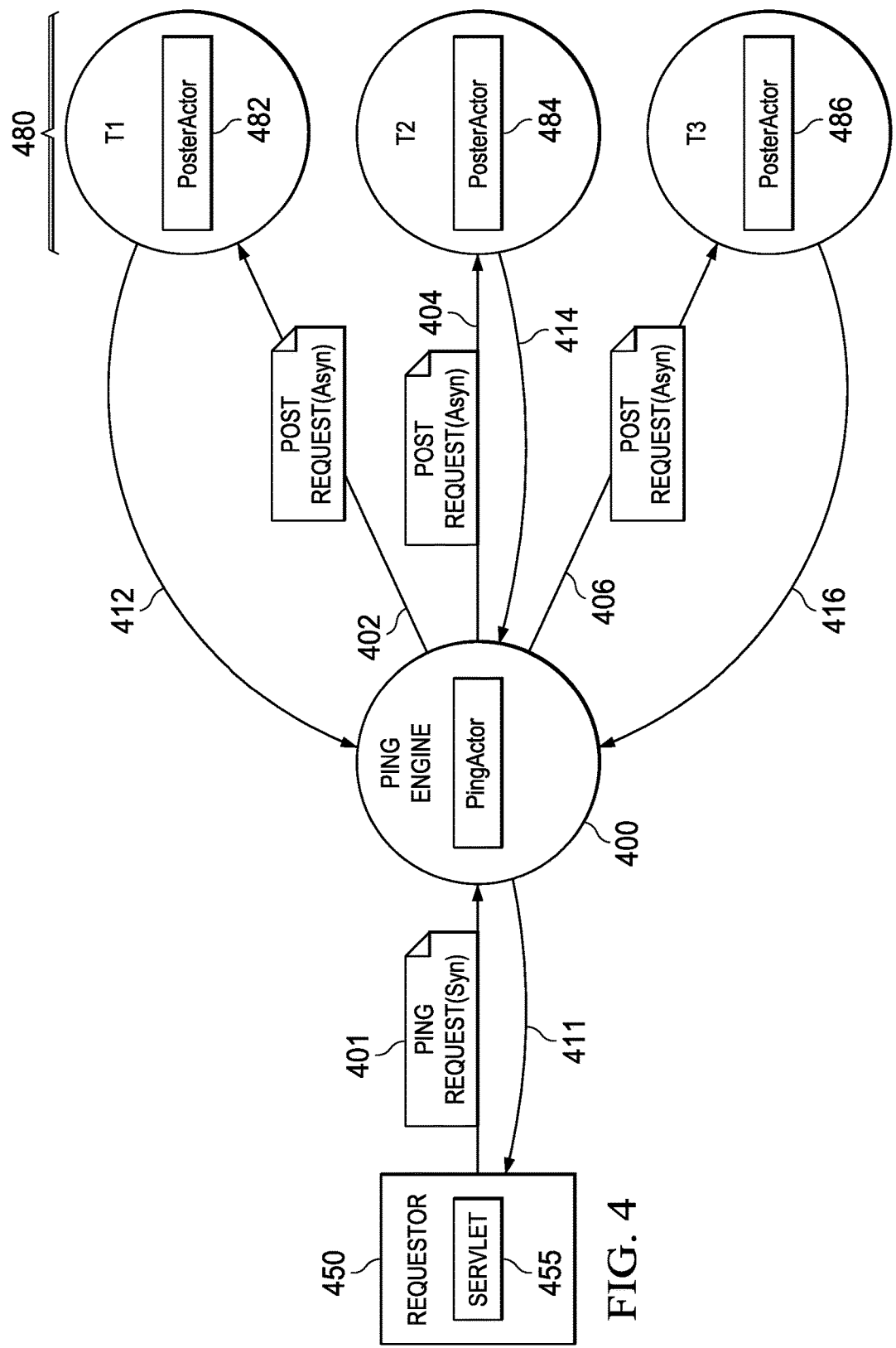
FIG. 4 depicts a diagrammatic representation of an actor model framework implementing a ping engine according to some embodiments.

Some embodiments of a ping engine may implement an actor model framework, as illustrated in FIG. 4. As an example, servlet 455 employed by requestor 450 may send ping request 401 to ping engine 400. Ping engine 400 may operate as a PingActor in the Actor model and post (ping) requests 402, 404, and 406 to target systems 480 asynchronously. In response, one or more PosterActors 482, 484, and 486 operating on target systems 480 may return response(s) (e.g., 412, 414, and/or 416) to ping engine 400. Ping engine may aggregate and/or further process the responses and return response 411 to requestor 450. Ping engine 400 may be implemented in many ways, including utilizing an actor model framework known as JActor. Numerous other implementations are also possible.

Figure 5:
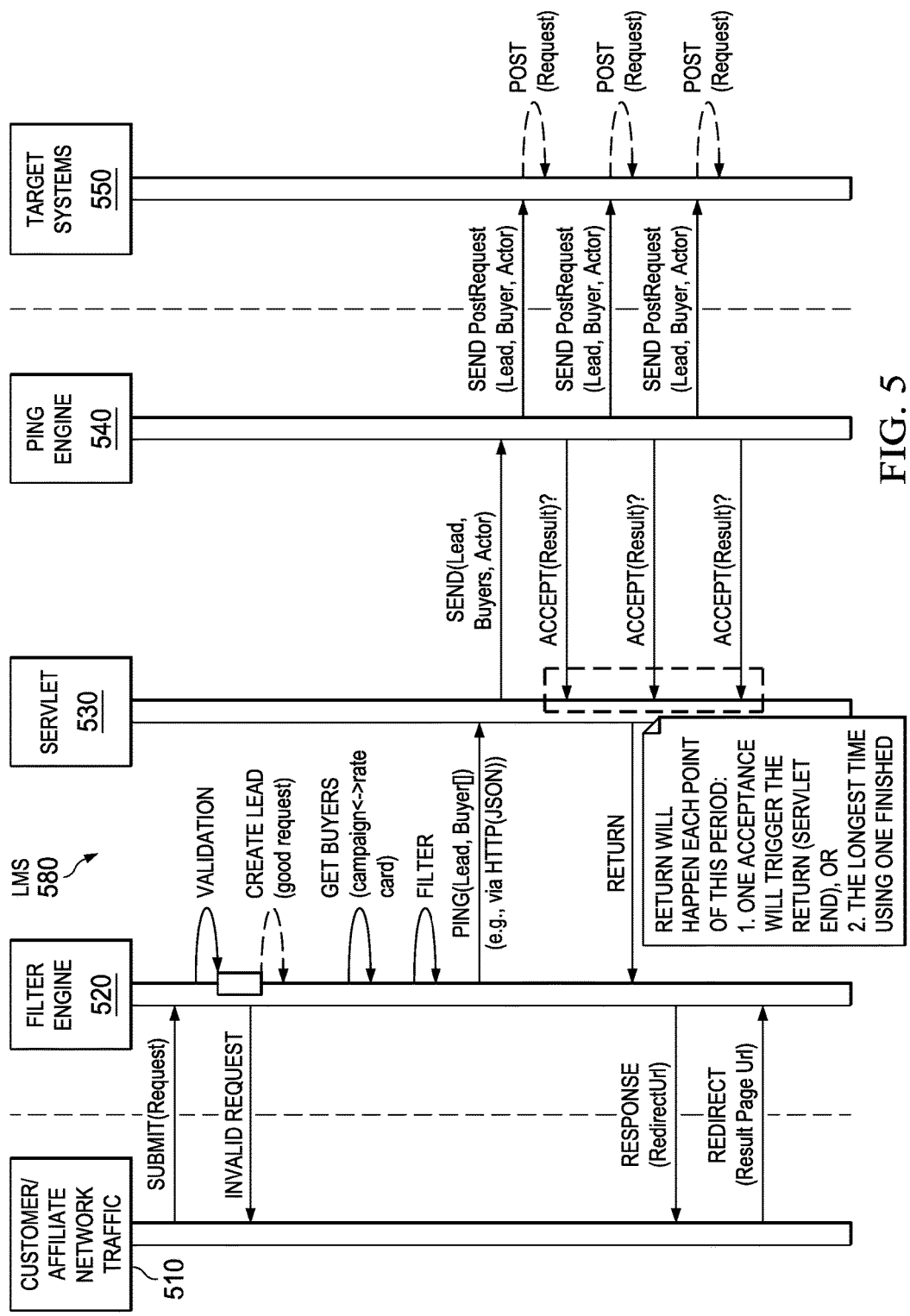
FIG. 5 depicts a sequence diagram illustrating example operations of a system disclosed herein according to some embodiments.

FIG. 5 depicts a sequence diagram illustrating example operations of a system disclosed herein according to some embodiments. In the example of FIG. 5, customer or affiliate 510 of LMS 580 may send (e.g., on behalf of or triggered by a web site visitor visiting a web site operated by affiliate 510) a request to filter engine 520 of LMS 580. In this example, filter engine 520 may include the functionality of a parser described above. For example, filter engine 520 may verify and validate the request (network traffic) received from affiliate 510. If the request is invalid, filter engine 520 may send an "invalid" response to affiliate 510. If the request is valid, filter engine 520 may determine that the request contains a good lead and record a lead entry, for instance, in a table of a database, or some other suitable data structure. As described above, filter engine 520 may process the lead using various filters and identify, on-the-fly, best matched buyers for the lead. In some embodiments, filter engine 520 may communicate with ping engine 540 via servlet 530 regarding target systems 550 that best matched the lead. In some embodiments, filter engine 520 and ping engine 540 may reside on the same server machine or different server machines.

As described above, sequentially or simultaneously, ping engine 540 may initiate a pinging process for sending the lead to the best matched target system(s) 550. As described above, each target system 550 may process the lead and return a result back to ping engine 540. Ping engine 540, in turn, may return a response back to servlet 530. Servlet 530 may then send a response to filter engine 520 as soon as the pinging process is finished. Filter engine 520 receives the response from servlet 530 and, correspondingly, returns a response to affiliate 510. The response from filter engine 520 may include an instruction to redirect the web site visitor's browser to a specific network address (e.g., a universal resource locator or URL associated with one of target system 550 or a specific result page provided by LMS 580).

Figure 6:
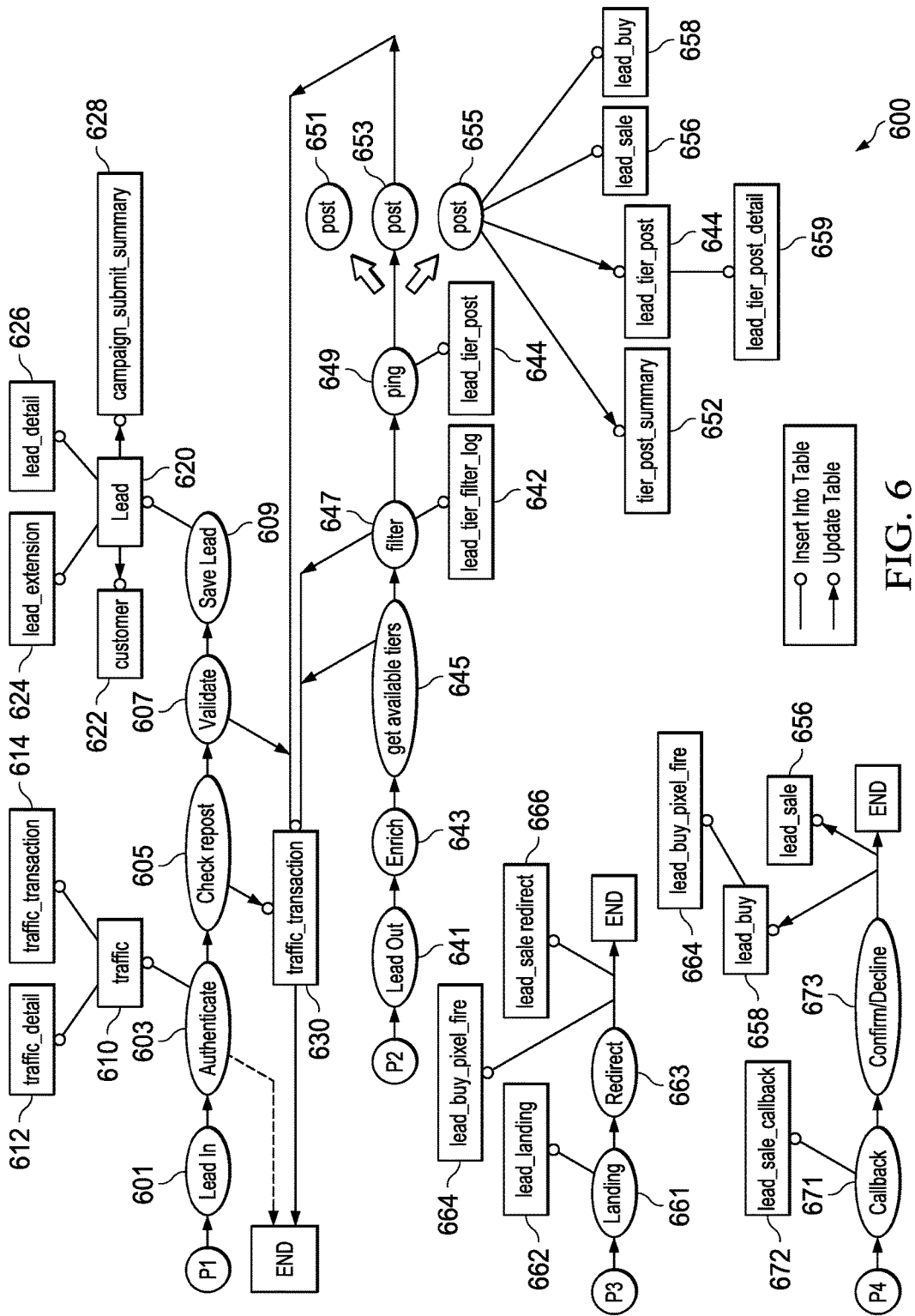
FIG. 6 depicts a data flow diagram illustrating a lead life cycle according to some embodiments.

FIG. 6 depicts a data flow diagram illustrating a lead life cycle according to some embodiments. As illustrated in the example of FIG. 6, lead life cycle 600 may involve many processes (e.g., P1, P2, P3, P4, etc.) for handling various scenarios, including Lead In 601, Lead Out 641, Landing 661, Callback 671, etc.

Lead In—when a customer submits a new lead to the system:
1) An affiliate may send a new lead and information of which can be authenticated (603) and saved into database tables of traffic 610, traffic detail 612, traffic_transaction 614.
2) The system checks to see if the current traffic transaction already exists in the system (605). If so, traffic_transaction table 630 is updated. If not, the current traffic transaction is validated (607) and the updated result is stored in traffic_transaction table 630.
3) If the traffic transaction is valid, the current new lead is saved (609) into database tables of lead 620, customer 622, lead_extension 624, lead_detail 626, campaign_submit_summary 628.

Lead Out—when the system sends out a valid lead:
1) After a lead is stored, the system appends additional affiliate and campaign information to the request (643) before sending traffic to tiers.
2) The system gets available tiers (645) and update database table traffic_transaction 630.
3) The system filters out unnecessary tiers and/or unqualified candidate systems (647) and insert log to lead_tier_filter_log 642.
4) The system sends posts 651, 653, 655, respectively, to each poster related to each qualified target system (e.g., one associated with a tier) (649), inserts data to database tables of tier_post_summary 652, lead_tier_post 644, lead_sale 656, lead_buy 658, lead_tier_post_detail 659 and updates traffic_transaction table 630.

Landing—when the system sends a response to an affiliate:
1) The system sends a response to an affiliate (661) and inserts data into lead_landing table 662.
2) The system redirects the affiliate to qualified target system(s) (663) and inserts data into database tables of lead_sale_redirect 666, lead_buy_pixel_fire 664.

Callback—when the system receives a response from a qualified target system:
1) Responsive to target systems confirming or declining the lead when callback (673), the system updates results into database table of lead_sale_calback 672, lead_buy_pixel_fire 664, lead_sale 656, lead_buy 658.

Figure 7:
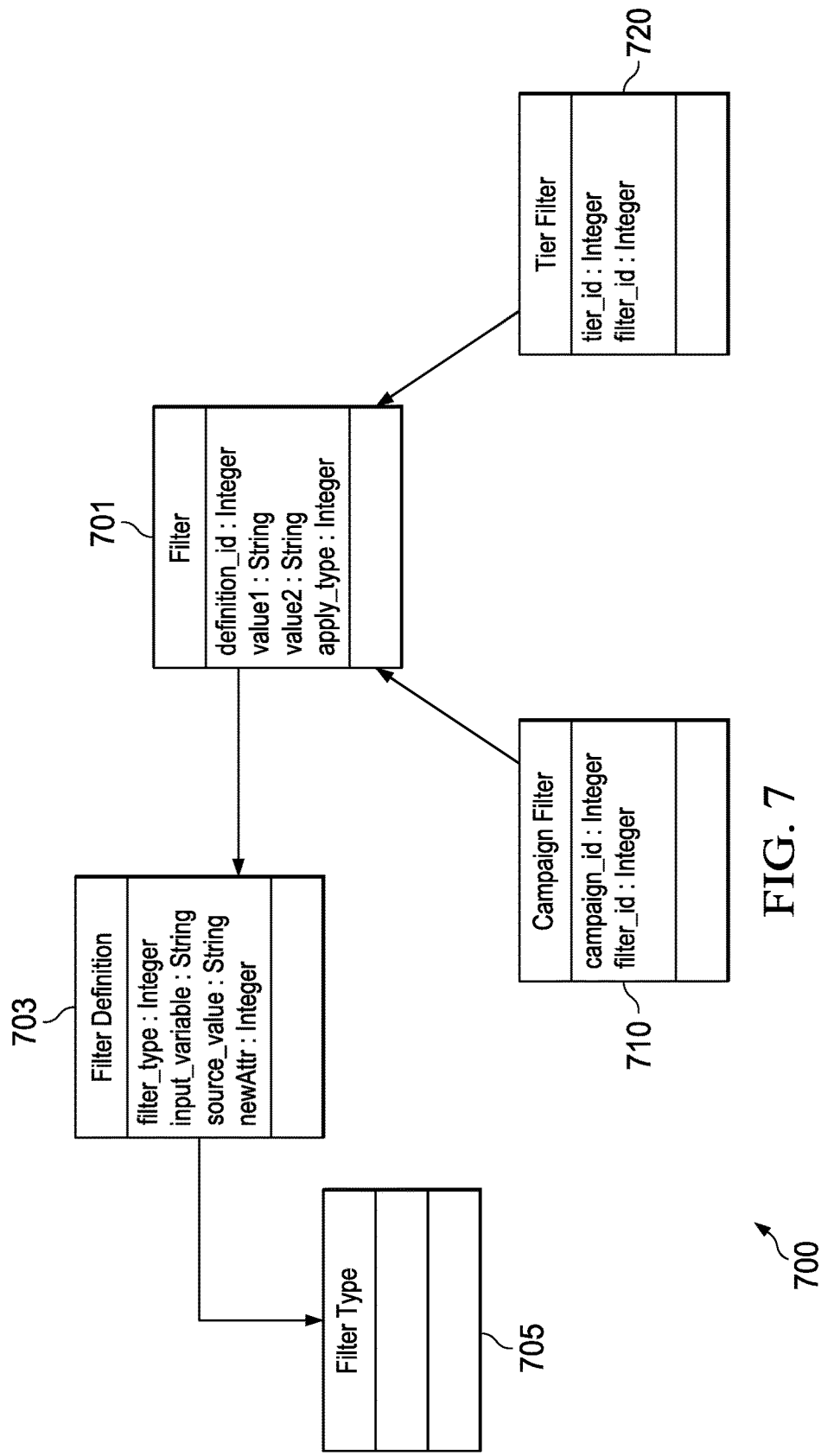
FIG. 7 illustrates an example data model according to some embodiments.

Some embodiments of a filter engine described above may have a set of built-in filter types. FIG. 7 illustrates by example how filter type 705 may be instantiated from filter definition 703 of filter 701 in accordance with data model 700. In some embodiments, filter 701 may be associated with campaign filter 710 and/or part of tier filter 720. These filters may be created, modified, configured or otherwise manipulated in many ways.

FIG. 8A is a diagrammatic representation of user interface 801 illustrating by example how a filter may be created. FIG. 8B is a diagrammatic representation of user interface 803 illustrating how an affiliate (e.g., a lead provider) may choose how they want to filter candidate target systems (e.g., lead buyers), utilizing filters associated with their affiliate identifier (ID).

Figure 9B:
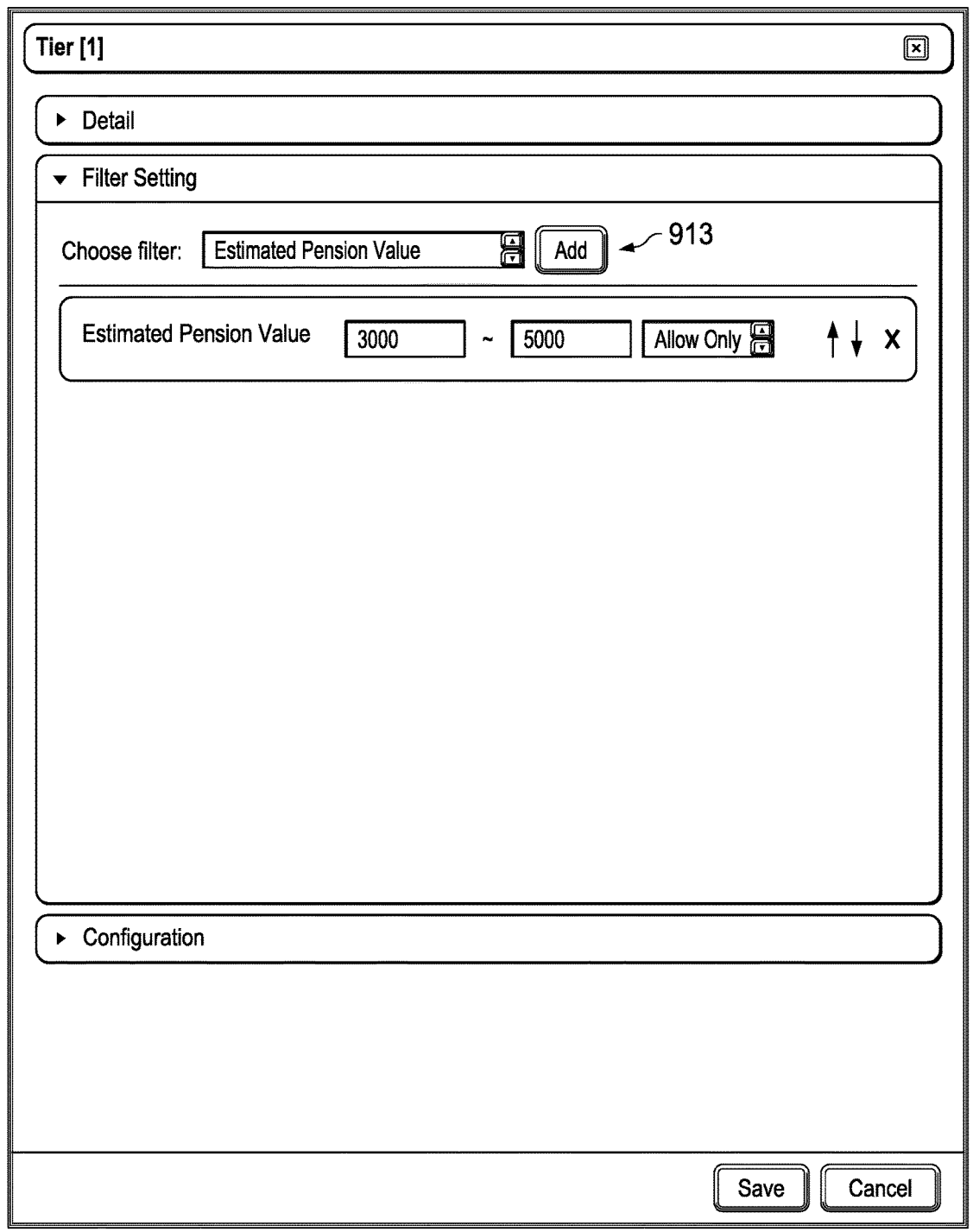

FIG. 9A is a diagrammatic representation of user interface 901 illustrating one example of how a filter "Estimated Pension Value" may be configured. FIG. 9B is a diagrammatic representation of user interface 903 illustrating how the filter shown in FIG. 9A may be selected via menu 913 and utilized at a tier level.

FIG. 10A is a diagrammatic representation of user interface 1001 illustrating another example of how a filter "Monday Service Hours Range" may be configured. FIG. 10B is a diagrammatic representation of user interface 1003 illustrating how the filter shown in FIG. 10A may be selected via menu 1013 and utilized at a tier level. FIG. 100 is a diagrammatic representation of user interface 1004 illustrating how a filter may be created based on a filter type.

Example use cases will now be described with reference to FIGS. 11-22.

Suppose an embodiment of an intelligent real-time lead management system disclosed herein operates on a multi-tenant computing platform and one of its tenants "Tenant" is a lead publisher. As an affiliate of the system, Tenant may create a campaign for selling leads it gets from its network traffic (e.g., via a web site). To do so, Tenant may create, via a user interface provided by the system, a campaign "Demo Debt Cam" with the following campaign keys:
client_id=20
client_secret=6d78688368fde3cab12e3c804ecd0b39
campaign_id=1

Tenant may configure the campaign, via the user interface, such that its network traffic is communicated to the system via a particular channel (integration method) such as an API channel described above. Further, Tenant may create/configure the following filters for the campaign:
Duplicated Accepted Email—Filter Out
Is valid UK number—Allow FIG. 11 is a diagrammatic representation of user interface 1100 illustrating the example details described above. In this case, the lead publisher/affiliate has its own system (e.g., a web site) to collect network traffic (e.g., potential lead data) and communicates (e.g., posts) the collected data to the system using the API access point and integration method identified in the campaign.

Use Case 1—Traffic Failed in Authentication

Suppose the lead publisher/affiliate sends the network traffic to the system without campaign information (e.g., a client identifier associated with the lead publisher/affiliate) or with the wrong campaign information, the network traffic will be invalidated by the validation layer of the system. For example, as described above with reference to FIG. 3, parser engine 320 may identify that a campaign parameter or key such as "client_id" or "client_secret" in the incoming network traffic from API channel 301 is missing, contains no value, or has an incorrect value (e.g., does not match the campaign key identified in the campaign).

Use Case 2—Traffic Failed in Field Validation

Suppose the lead publisher/affiliate sends the network traffic to the system with the wrong field format and/or without required field(s), the network traffic will be invalidated by the validation layer of the system. For example, suppose the following fields are identified in the campaign:

name (required)
phone_number (required)
email (required)
debt level (required)
monthly_payment (required)
disposable_income (required)
callback_time (required)
property_value
property_equity However, the network traffic received by the system from the lead publisher/affiliate is as follows: https://core.intelligentrealtimeleadmanagementsystem.com/debt/api?client_id=20&client_secret=6d78688368fde3cab12e3c804ecd0b-39&campaign_id=1&name=demo&phone_number=6094018321&email=iamnotanemail&debt_level=2500&monthly_payment=350&disposable_income=300&calling_time=NOW&property_value=3000&property_equity=2000

The system may parse the incoming network traffic (which, in this example, is in the form of a text string) and determine (e.g., using a validation rule associated with the example campaign that specifies a correct format for a particular field) whether any of the fields required by the campaign is missing and/or has an incorrect format. In this example, the email field has an incorrect format and, therefore, the network traffic received by the system will fail the field evaluation, even if it has been authenticated as a valid campaign. Likewise, when network traffic received by the system misses a field required by a campaign, it will fail the field evaluation.

Use Case 3—Traffic Filtered Out

Suppose the network traffic received by the system from the lead publisher/affiliate is authenticated and passes the validation check, it may still be filtered out per the campaign filter setting(s). For example, a filter setting may specify not to accept a lead having an email address already in the system so as to avoid a potential duplicate of an existing lead. As described above, a filter engine may process a potential new lead and determine that an email address in the potential new lead is the same as an existing lead. The filter engine may determine, based on the result of this comparison, that the potential new lead is a duplicate and not an actual new lead and, therefore, stop or otherwise terminate the processing.

As another example, as illustrated in FIG. 12, which depicts a diagrammatic representation of user interface 1200 illustrating a filter log, even when everything checks out and the field format is correct, the filter engine may still filter out lead data when the field value itself is invalid. In this case, the field format of the phone number passed the validation check. However, the phone number failed the filter "Is Valid UK Phone," indicating that the phone number is not an active number. The processing ends and the filter engine stores the result of the analysis in the filter log.

Use Case 4—Good Traffic Becomes a Lead.

FIG. 13 depicts a diagrammatic representation of user interface 1300 illustrating an example of a lead derived from incoming network traffic received by the system from a lead publisher/affiliate the network traffic is authenticated, passed the validation check, and is not filtered out at the campaign level. In some cases, such a lead is then processed via the filter engine at the tier level using tier level filters. In some embodiments, the filter engine described above may include a campaign level filter engine and a tier level filter engine.

As such, processing a lead may include the campaign level filter engine, after the lead passed campaign level filters, communicating the lead to the tier level filter engine which, in turn, processes the lead using tier level filters.

For the sake of illustration, suppose a lead seller "Demo Tenant" would like to sell leads to a lead buyer "Demo Advertiser" and the lead buyer has the following channels:
Tier1—Service time (Mon.~Wed. 9:00 AM~15:00 PM), only accepts debt amount (debt_level)>2000
Tier2—Service time (Wed.~Fri. 9:00 AM~15:00 PM), only accepts debt amount (debt_level)>2500
Tier3—Service time (Mon.~Fri. 9:00 AM~17:00 PM), accepts deb amount(debt_level)<=monthly_payment+2000

Figure 17:

The lead seller may create/set up three tier filters accordingly, via user interfaces 1400, 1500, and 1600, as shown in FIGS. 14, 15, and 16. As illustrated in FIG. 17, the lead seller may then group, for instance, via user interface 1700, these tiers together in a program ("Demo Debt Program" 1710). In this example, tiers 1720 associated with program 1710 may be shown in user interface 1700 in the form of a table or list. As illustrated in FIG. 18, the lead seller may, via user interface 1800, associate program 1710 having tiers 1720 with campaign 1810.

Suppose the lead generated in Use Case 4 described above has the following details:
name=Demo Pyraleads
phone_number=6094018321
email=demo@pyraleads.com
debt_level=2500
monthly_payment=350
disposable_income=3000
callback_time=NOW
property_value=3000
property_equity=200

As an example, suppose UK time at this moment (when the lead is being processed) is Tuesday, 15 December 12:28 pm which, as shown in FIGS. 14-16, is within the service time defined in all three tiers, the lead appears to satisfy the requirements defined in all three tiers (Tier1, Tier2, Tier3). However, Tier2 only accepts when the debt amount of a lead is more than 2500 (i.e., 2501 or more) and Tier3 only accepts when the debt amount of a lead is less or equal to the monthly payment plus 2000. In this case, the lead has a debt level of 2500 which is less than what is required by Tier2 and which is more than what is required by Tier3. Thus, Tier2 and Tier3 are filtered out. The result of this tier filter process is logged by the system in a tier filter log, which is accessible via user interface 1900, as illustrated in FIG. 19. Wth the filter processes described above, in this example, only Tier1 is satisfied for all the tier filter settings. Therefore, the lead is sent to the channel associated with Tier1. This ping is logged by the system in a ping log which, as illustrated in FIG. 20, may be accessible via user interface 2000.

As another example, suppose a lead has the following details:
name=Demo Pyraleads
phone_number=6094018321
email=demo@pyraleads.com
debt_level=2500
monthly_payment=550
disposable_income=3000
callback_time=NOW
property_value=3000
property_equity=2000

In this case, the lead satisfied both Tier1 and Tier3 (monthly_payment plus 2000=2550 and the debt level of 2500 is less than 2500, as required by Tier3). Thus, only Tier2 is filtered out. This is reflected in the filter log, as shown in user interface 2100 of FIG. 21.

With the filter processes described above, in this example, Tier1 and Tier3 are satisfied for all the tier filter settings. Therefore, the lead is sent to the channels associated with Tier1 and Tier3. This is reflected in the ping log, as shown in user interface 2200 of FIG. 22.

As the above-described examples illustrate, a lead provider can create a lead management process for a lead buyer (e.g., a dealership) for all stages of a lead lifecycle, including capturing new leads, distributing leads, marketing leads, tracking leads, converting leads, and analyzing leads. As explained above, embodiments disclosed herein may be adapted or otherwise implemented for management of various types of leads beyond vehicle sale leads (e.g., life insurance leads, home loan leads, etc.). Additionally, although a cloud-based solution is described in detail, those skilled in the art will appreciate that embodiments disclosed herein may be deployed or otherwise implemented as cloud-based or non-cloud-based (SaaS or non-SaaS) solutions.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by any means. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for intelligent real-time lead management, the method comprising:

receiving, by a lead management system having a filter engine, a ping engine, a processor, and a non-transitory computer memory, network traffic from a lead provider server communicatively connected to the lead management system over a network;

authenticating the network traffic received from the lead provider server, the authenticating including determining whether the network traffic from the lead provider server contains a client identifier associated with an operator of the lead provider server and, when the client identifier is found in the network traffic, whether the client identifier matches a key associated with the operator and stored on the lead management system;

when the network traffic received from the lead provider server passes the authentication, forwarding the network traffic received to the filter engine of the lead management system;

filtering, by the filter engine of the lead management system, the network traffic received from the lead provider server, the filtering comprising processing the network traffic in accordance with filter rules defined at a validation layer and multi-level filter layers, the validation layer including a validation rule associated with a campaign that specifies a campaign identifier, fields required by the campaign, and a correct field format, wherein the multi-level filter layers comprise a campaign level filter layer and a tier level filter layer, and wherein processing the network traffic through the campaign level filter layer and the tier level filter layer utilizes campaign level filters and tier level filters instantiated from filter definitions in accordance with a data model, the campaign level filters defined or configured for a campaign associated with an operator of the lead provider server, the tier level filters defined or configured by the operator for different tiers associated with the one or more target systems;

stopping the filtering when the network traffic fails an evaluation at any of the validation layer and multi-level filter layers;

when the network traffic received from the lead provider server passes the filtering, the filter engine further performing:

identifying one or more target systems from the different tiers that, according to the campaign, most optimally match a lead contained in the network traffic, the one or more target systems comprising a telephone; and sending the lead and data identifying the one or more target systems to the ping engine;

pinging, by the ping engine, the one or more target systems identified by the filter engine; and responsive to receiving a response from a target system of the one or more target systems, the lead management system communicating the response from the target system to the lead provider server in real time in response to receiving the network traffic from the lead provider server.

2. The method according to claim 1, wherein the network traffic is received by the lead management system from the lead provider server via a communication channel.

3. The method according to claim 2, wherein the communication channel comprises an application programming interface channel or iframe channel.

4. The method according to claim 1, wherein processing the network traffic through the validation layer comprises:

parsing the network traffic from the lead provider server;

identifying fields and associated field values in the network traffic; and performing at least one evaluation of whether a required field of a campaign is missing from the network traffic, whether a field of the fields in the network traffic is missing an associated field value, whether a field of the fields in the network traffic contains an incorrect associated field value, or whether an associated field value for a field of the fields in the network traffic has an incorrect format.

5. A computer program product for intelligent real-time lead management, the computer program product comprising at least one non-transitory computer-readable medium storing instructions translatable by at least one processor to perform:

receiving network traffic from a lead provider server over a network;

authenticating the network traffic received from the lead provider server, the authenticating including determining whether the network traffic from the lead provider server contains a client identifier associated with an operator of the lead provider server and, when the client identifier is found in the network traffic, whether the client identifier matches a key associated with the operator and stored on the lead management system;

when the network traffic received from the lead provider server passes the authentication, performing:

filtering the network traffic received from the lead provider server, the filtering comprising processing the network traffic in accordance with filter rules defined at a validation layer and multi-level filter layers, the validation layer including a validation rule associated with a campaign that specifies a campaign identifier, fields required by the campaign, and a correct field format, wherein the multi-level filter layers comprise a campaign level filter layer and a tier level filter layer, and wherein processing the network traffic through the campaign level filter layer and the tier level filter layer utilizes campaign level filters and tier level filters instantiated from filter definitions in accordance with a data model, the campaign level filters defined or configured for a campaign associated with an operator of the lead provider server, the tier level filters defined or configured by the operator for different tiers associated with the one or more target systems;

stopping the filtering when the network traffic fails an evaluation at any of the validation layer and multi-level filter layers;

when the network traffic received from the lead provider server passes the filtering, further performing:

identifying one or more target systems from the different tiers that, according to the campaign, most optimally match a lead contained in the network traffic, the one or more target systems comprising a telephone;

pinging the one or more target systems; and responsive to receiving a response from a target system of the one or more target systems, communicating the response from the target system to the lead provider server in real time in response to receiving the network traffic from the lead provider server.

6. The computer program product of claim 5, wherein the network traffic is received from the lead provider server via a communication channel.

7. The computer program product of claim 6, wherein the communication channel comprises an application programming interface channel or iframe channel.

8. The computer program product of claim 5, wherein processing the network traffic through the validation layer comprises:

parsing the network traffic from the lead provider server;

identifying fields and associated field values in the network traffic; and performing at least one evaluation of whether a required field of a campaign is missing from the network traffic, whether a field of the fields in the network traffic is missing an associated field value, whether a field of the fields in the network traffic contains an incorrect associated field value, or whether an associated field value for a field of the fields in the network traffic has an incorrect format.

9. A system for intelligent real-time lead management, the system comprising:
- at least one processor;
- at least one non-transitory computer-readable medium coupled to the at least one processor; and
- control logic embodied on the at least one non-transitory computer-readable medium to implement functions of a filter engine, a ping engine, and a data store to perform:
- receiving network traffic from a lead provider server over a network;
- authenticating the network traffic received from the lead provider server, the authenticating including determining whether the network traffic from the lead provider server contains a client identifier associated with an operator of the lead provider server and, when the client identifier is found in the network traffic, whether the client identifier matches a key associated with the operator;
- when the network traffic received from the lead provider server passes the authentication, forwarding the network traffic received to the filter engine;
- filtering the network traffic received from the lead provider server, the filtering comprising the filter engine processing the network traffic in accordance with filter rules defined at a validation layer and multi-level filter layers, the validation layer including a validation rule associated with a campaign that specifies a campaign identifier, fields required by the campaign, and a correct field format, wherein the multi-level filter layers comprise a campaign level filter layer and a tier level filter layer, and wherein processing the network traffic through the campaign level filter layer and the tier level filter layer utilizes campaign level filters and tier level filters instantiated from filter definitions in accordance with a data model, the campaign level filters defined or configured for a campaign associated with an operator of the lead provider server, the tier level filters defined or configured by the operator for different tiers associated with the one or more target systems;
- the filter engine stopping the filtering when the network traffic fails an evaluation at any of the validation layer and multi-level filter layers;
- when the network traffic received from the lead provider server passes the filtering, the filter engine further performing:
- identifying one or more target systems from the different tiers that, according to the campaign, most optimally match a lead contained in the network traffic, the one or more target systems comprising a telephone; and
- sending the lead and data identifying the one or more target systems to the ping engine;
- the ping engine pinging the one or more target systems identified by the filter engine; and
- responsive to receiving a response from a target system of the one or more target systems, communicating the response from the target system to the lead provider server in real time in response to receiving the network traffic from the lead provider server.

10. The system of claim 9, wherein processing the network traffic through the validation layer comprises:
- parsing the network traffic from the lead provider server;
- identifying fields and associated field values in the network traffic; and
- performing at least one evaluation of whether a required field of a campaign is missing from the network traffic, whether a field of the fields in the network traffic is missing an associated field value, whether a field of the fields in the network traffic contains an incorrect associated field value, or whether an associated field value for a field of the fields in the network traffic has an incorrect format.

11. The system of claim 9, wherein the network traffic is received from the lead provider server via a communication channel and wherein the communication channel comprises an application programming interface channel or iframe channel.

* * * * *